US011279193B2

(12) United States Patent
Werner et al.

(10) Patent No.: US 11,279,193 B2
(45) Date of Patent: Mar. 22, 2022

(54) MOUNTING SYSTEM FOR THE ELASTIC MOUNTING OF A STRUT OR A VIBRATION DAMPER

(71) Applicant: VIBRACOUSTIC GMBH, Darmstadt (DE)

(72) Inventors: Philipp Werner, Lueneburg (DE); Hilrich Kardoes, Winsen (DE); Michael Mess, Seevetal (DE); Antoine Geslain, Nantes (FR)

(73) Assignee: Vibracoustic SE, Darmstadt (DE)

( * ) Notice: Subject to any disclaimer, the term of this patent is extended or adjusted under 35 U.S.C. 154(b) by 0 days.

(21) Appl. No.: 16/619,683

(22) PCT Filed: Jan. 31, 2019

(86) PCT No.: PCT/EP2019/052422
§ 371 (c)(1),
(2) Date: Dec. 5, 2019

(87) PCT Pub. No.: WO2019/154715
PCT Pub. Date: Aug. 15, 2019

(65) Prior Publication Data
US 2020/0376912 A1    Dec. 3, 2020

(30) Foreign Application Priority Data

Feb. 7, 2018   (DE) .................... 10 2018 102 745.1
Nov. 22, 2018  (WO) ............... PCT/EP2018/082283

(51) Int. Cl.
*B60G 13/00*    (2006.01)
*B60G 15/06*    (2006.01)
(Continued)

(52) U.S. Cl.
CPC ......... *B60G 13/003* (2013.01); *B60G 15/067* (2013.01); *B62D 25/088* (2013.01);
(Continued)

(58) Field of Classification Search
CPC .......... B60G 2204/128; B60G 2204/41; B60G 2204/4502; B60G 2204/45021;
(Continued)

(56) References Cited

U.S. PATENT DOCUMENTS 4,497,523 A * 2/1985 Lederman ............ B60G 15/068
280/124.155
5,641,152 A    6/1997 Angles et al.
(Continued)

FOREIGN PATENT DOCUMENTS

DE    3713699 A1    11/1987
DE    3713699 C2    12/1994
(Continued)

OTHER PUBLICATIONS

DE10335956A1, English translation received from espacenet Aug. 17, 2021 (Year: 2003).*

(Continued)

*Primary Examiner* — Paul N Dickson
*Assistant Examiner* — Caitlin Anne Miller
(74) *Attorney, Agent, or Firm* — Fishman Stewart PLLC (57) ABSTRACT

A mounting system for the elastic mounting of a strut or a vibration damper on a vehicle body includes a unit insertable into a receiving cup and a fixing device. The unit includes a mounting unit and a piston rod of a strut or vibration damper. In embodiments, the mounting unit has an elastomer mount for mounting the piston rod; the elastomer mount has a core for receiving the piston rod and an elastomer body, and a ring element that is a separate part or is non-positively, positively and/or materially connected to the body; the unit and fixing device may be inserted into the receiving cup from a side facing away from the body; the fixing device engages behind an undercut formed on the receiving cup; the ring element is supported on the fixing device; and/or the (Continued)

elastomer body is prestressed and presses the ring element against the fixing device.

17 Claims, 6 Drawing Sheets

(51) Int. Cl.
  *B62D 25/08* (2006.01)
  *F16F 9/58* (2006.01)
(52) U.S. Cl.
  CPC .......... *B60G 2204/128* (2013.01); *B60G 2204/41044* (2013.01); *B60G 2204/4502* (2013.01); *F16F 9/58* (2013.01)
(58) Field of Classification Search
  CPC .. B60G 13/003; B60G 15/067; B62D 25/088; F16F 9/54; F16F 9/58
  See application file for complete search history.

(56) References Cited

U.S. PATENT DOCUMENTS

| | | | |
|---|---|---|---|
| 6,260,835 | B1 | 7/2001 | Angles et al. |
| 6,666,439 | B2 | 12/2003 | Romer |
| 8,025,274 | B2 | 9/2011 | Herman et al. |
| 2015/0266351 | A1 | 9/2015 | Schoenherr |
| 2020/0062062 | A1* | 2/2020 | Jeong .................. F16C 33/7813 |
| 2021/0131489 | A1* | 5/2021 | Werner .................. F16C 19/10 |

FOREIGN PATENT DOCUMENTS

| | | | | |
|---|---|---|---|---|
| DE | 4440030 | A1 | 5/1996 | |
| DE | 19758524 | A1 | 7/1999 | |
| DE | 19758524 | C2 | 7/1999 | |
| DE | 19758524 | C2 | 6/2000 | |
| DE | 10205264 | A1 | 8/2003 | |
| DE | 10309202 | A1 | 9/2004 | |
| DE | 10335956 | A1 | 2/2005 | |
| DE | 102004039734 | A1 * | 2/2006 | ........... B60G 13/003 |
| DE | 102006033801 | A1 | 1/2008 | |
| DE | 102007023886 | A1 | 12/2008 | |
| DE | 102014205194 | A1 | 9/2015 | |
| EP | 1547831 | A2 | 6/2005 | |
| EP | 2295270 | A2 | 3/2011 | |
| EP | 2570276 | A1 * | 3/2013 | ........... B60G 15/067 |
| WO | WO-2015014760 | A1 * | 2/2015 | ........... B60G 15/068 |
| WO | 2018024500 | A1 | 2/2018 | |
| WO | 2018024508 | A1 | 2/2018 | |

OTHER PUBLICATIONS

EP2295270A3, English translation received from espacenet Aug. 19, 2021 (Year: 2009).*
International Search Report, PCT/EP2018/082283, dated Feb. 28, 2019.
International Search Report, PCT/EP2019/052422, dated Feb. 29, 2019.

* cited by examiner

MOUNTING SYSTEM FOR THE ELASTIC MOUNTING OF A STRUT OR A VIBRATION DAMPER

CROSS-REFERENCE TO RELATED APPLICATIONS

This application is a National Stage Patent Application of International Patent Application No. PCT/EP2019/052422, filed Jan. 31, 2019, which claims the benefit of German Application Serial No. 10 2018 102 745.1, filed Feb. 7, 2018, and International Patent Application No. PCT/EP2018/082283, filed Nov. 22, 2018. the contents of each are incorporated by reference in their entireties.

TECHNICAL FIELD

The present invention relates to a mounting system for the elastic mounting of a strut or a vibration damper on a vehicle body in a receiving cup on the body side. Furthermore, the invention relates to a strut or a vibration damper with such a mounting system.

BACKGROUND

A strut or vibration damper of the type mentioned above is used in the chassis of a vehicle to dampen the vibrations caused by the unevenness of the road surface. In this context, it is known that the strut or the vibration damper is connected to the vehicle body via a so-called strut mount. The strut mount allows the strut or vibration damper to rotate relative to the vehicle body and compensates for an angular offset between the strut or vibration damper and the vehicle body. The strut mount is usually designed as a rubber-metal mount. This rubber-metal mount is usually located in a bearing receptacle, the top mount housing, which is screwed to the vehicle body.

To attach the strut or vibration damper to the vehicle body, the piston rod of the strut or vibration damper is screwed to the core of the rubber-metal bearing. This screwing is usually carried out from above, so that sufficient space must be available for assembly. Especially with top mounts on the rear axle, this regularly poses challenges for the designers.

DE 37 13 699 C2 discloses a body-side mounting of a strut or a spring damper, in which a rubber-metal bearing is pre-assembled on a free end of a damper piston rod by means of a nut and inserted from below into a receiving cup of a vehicle body. In order to retain the rubber-metal bearing and thus also the strut in the direction of deflection, the rubber-metal bearing is latched into the receiving cup with parts fixed to the vehicle body. For this purpose, a snap ring or spring ring is inserted into a receptacle introduced in the edge area of a shoulder of a sheet metal outer cup of the rubber-metal bearing. The snap ring or spring ring engages in slots of the receiving cup during insertion.

Furthermore, DE 197 58 524 C2 provides a quick connection between a connecting part of an elastic joint which is connected to a piston rod of a strut, and a sheet metal of a vehicle body. The body is provided with tangs which are bent upwards and provided with recesses, while the connecting part in the area of the cylindrical section has an annular groove in which a snap ring is inserted. During assembly, the cylindrical section of the connecting part engages in the elastic opening formed by the tangs until the snap ring engages in the recesses of the tangs. A metal cover is then pressed onto the outside of the tangs, thereby creating a radial and axial tight connection between the connecting part and the body.

SUMMARY

The present invention is based on the task of creating a mounting system for the elastic mounting of a strut or a vibration damper on a vehicle body, as well as a strut or a vibration damper that has an improved and more cost-efficient connection of the mounting and does not require any access for assembly from above.

In order to solve the task, a mounting system having the features of claim 1 and a strut or vibration damper having the features of claim 16 are proposed.

Advantageous embodiments of the storage system are the subject of the dependent claims.

According to the invention, the mounting system for the elastic mounting of a strut or a vibration damper on a vehicle body in a receiving cup provided on the vehicle body side, having a unit which is insertable into the receiving cup, and a fixing device which secures the unit from being withdrawn from the receiving cup, the unit having a mounting unit and a piston rod of the strut or the vibration damper, the mounting unit having at least one elastomer mount for resiliently mounting the piston rod, the elastomer mount having a core for receiving the piston rod and an elastomer body, and having at least one ring element which is a separate part or is non-positively, positively and/or materially connected to the elastomer body, the unit and the fixing device being inserted into the receiving cup from a side facing away from the body, wherein, in the inserted state, the fixing device engages behind an undercut formed on the receiving cup, wherein the ring element is supported on the fixing device, and wherein the elastomer body is prestressed and presses the ring element against the fixing device.

With the mounting system according to the invention, it is possible to insert the mounting unit into the receiving cup and, at the same time, to secure it from being pulled out of the receiving cup by means of the fixing device. At the same time, it is also possible to connect the piston rod to the core of the elastomer mount in a non-positively, positively or materially connected before it is inserted into the receiving cup. This creates a mounting system that facilitates simplified and cost-effective assembly. In particular, the mounting system is designed in such a way that the entire strut, including the mounting unit and fixing device, can be inserted or plugged, in particular pressed, into the receptacle from below. The transition of the fixing device from an assembly position, in which the elastomer mount is inserted into the receiving cup and the fixing device is positioned on the support unit, to the securing position, in which the elastomer mount is secured in the receiving cup, takes place during insertion in or pressing into the receiving cup. This allows pre-assembly of the strut or the vibration damper with the elastomer mount, and no further assembly step is required to secure the mounting unit before pulling it out of the receiving cup. In particular, it is not necessary to ensure accessibility with assembly tools for the assembly of the mounting system from above, i.e. from the vehicle body side. Furthermore, the mounting system according to the invention can be disassembled without access from the other side of the vehicle body. In case of a repair, the strut or the vibration damper together with the mounting unit can be easily disassembled by loosening the fixing device from the bottom of the receiving cup without the need for an assembly tool operated from above. In addition, an undercut can be produced simply and cost-effectively by means of a forming process in the receiving cup. The elastomer body of the at least one elastomer mount of the mounting unit consists of an elastic polymer material, such as natural rubber, a compound based on TPE or EPDM, or a foam spring, such as PU. The elastomer mount may also have one or more elastomer bodies.

When the mounting unit is inserted into the receiving cup, the elastomer mount and the fixing device are initially over-pressed in the axial direction by means of the ring element. The elastomer mount and the fixing device are then transferred to the securing position. The overpressure causes an axial prestress to be applied to the elastomer body of the elastomer mount. In the securing position, the fixing device engages behind an undercut formed on the receiving cup, the ring element rests on the fixing device and the elastomer body presses the ring element against the fixing device due to its prestress. In the assembly position, the mounting unit is inserted into the receiving cup and the fixing device is positioned in such a way that it is pressed into the receiving cup as it is inserted. This is usually accompanied by a change in the diameter of the fixing device. When transferring from the assembly position to the securing position, an intermediate position occurs in which the elastomer mount initially abuts against a cup bottom of the receiving cup and is not axially prestressed. The fixing device has a reduced diameter in the intermediate position compared to the assembly position. The diameter reduction results from the force applied when inserting the mounting unit into the receiving cup. The elastomer mount is only axially prestressed when the elastomer mount is pressed further into the receiving cup. The elastomer body is compressed by the axial prestress. The ring element can be materially connected to the elastomer body of the elastomer mount. The ring element can also be a separate part. 'From below' means in this context viewed in axial direction from below into the receiving pot.

When inserting the mounting unit into the receiving cup, it is advantageous to transfer the fixing device from the assembly position to the intermediate position and from the intermediate position to a securing position. Further advantageously, the fixing device has a first diameter in the assembly position. In the intermediate position the fixing device may have a second diameter which varies from the first diameter. In the securing position, the fixing device has either the first diameter or a third diameter that is slightly smaller or equal to the first diameter. To change the diameter, a force is required which is generated, for example, when the mounting device is pressed into the receiving cup. The mounting device is preferably inserted into the receiving cup in the deflection direction of the strut or the vibration damper.

In an advantageous embodiment, the elastomer mount and the fixing device are insertable into the receiving cup from a side facing away from the vehicle body. Thereby, the strut or the vibration damper with the mounting unit, including at least the elastomer mount, the fixing device and the piston rod already non-positively, positively or materially connected to the elastomer mount, can be inserted into the receiving cup from below. The side facing away from the vehicle body is in this case the exterior of the vehicle.

In an advantageous embodiment, the piston rod is positively, non-positively and/or materially connected to the core before being inserted into the receiving cup. This creates a pre-assembled unit that can be inserted into the receiving cup, in particular from a side facing away from the body. This eliminates the need for a body-side assembly step to fix the piston rod with the elastomer mount after the pre-assembled unit has been inserted into the receiving cup. In an advantageous design, the pre-assembled unit also includes the fixing device.

In an advantageous design, the receiving cup has an opening which, when in use, allows for assembling or disassembling of the piston rod with the core. Thus the unit comprising the strut or the vibration damper and the mounting unit can first be inserted into the receiving cup and then the strut or the vibration damper, in particular the piston rod of the strut or the vibration damper, is connected to the elastomer mount via the opening, for example by screwing the piston rod to the core of the elastomer mount. The opening also allows a subsequent disassembling of the piston rod in the position in which the fixing device is engaged in the undercut.

In an advantageous embodiment, the fixing device is designed as a securing ring. A combination of securing ring and undercut to secure the mounting unit from being withdrawn from the receiving top in the deflection direction offers simple and cost-effective fixing of the mounting device in the receiving cup. In a preferred embodiment, the securing ring is designed as a snap ring. The securing ring may have a round or angular cross-section. A securing ring with a round cross-section has the advantage that the securing ring automatically pulls the securing unit axially into the securing position as soon as the securing ring has sufficient axial overlap with the undercut, which allows it to expand. The undercut is preferably introduced into an inner wall of the receiving cup.

In an advantageous embodiment, the undercut is designed as a circumferential groove introduced into the mounting cup. A groove can be easily and economically formed into the receiving cup using a forming process such as a rolling process. The groove may have a round or angular contour in cross-section.

In an advantageous embodiment, the undercut is formed as a shoulder projecting into the interior of the mounting cup. Preferably, a rim hole of the body, in particular a section of the peripheral edge of the undercut, is used. As a result, a forming process for the undercut can be omitted, so that a simple and cost-effective fixing of the locking ring is created. For this purpose, the receiving cup may be designed as a separate component and welded to the vehicle body, wherein the rim hole of the vehicle body projects into the receiving cup and forms the undercut. Furthermore, the shoulder may also be formed by bending or flanging a peripheral edge of the rim-hole.

In an advantageous embodiment, the mounting unit has an additional spring receiving device which, prior to insertion of the unit into the receiving cup, is non-positively, positively and/or materially connected to the ring element, or which, after insertion of the unit into the receiving cup, is non-positively and/or positively connected to the ring element. The additional spring receiving device is used to attach an additional spring, such as a PU foam spring, for example. The additional spring limits the movement of the strut or the vibration damper relative to the vehicle body. Advantageously, the additional spring is inserted into the additional spring receiving device. Advantageously, the additional spring has a passage, wherein a piston rod of the strut or the vibration damper can extend through the passage. If the additional spring receiving device is non-positively, positively and/or materially connected to the ring element before the unit is inserted into the receiving cup, then the additional spring receiving device is part of a pre-assembled unit which can be inserted into the receiving cup. Further advantageously, the additional spring may be an integral part of the pre-assembled unit comprising the elastomer mount, the piston rod of the strut or vibration damper connected to the elastomer mount, and the additional spring receiving device connected to the ring element of the elastomer mount.

In an advantageous embodiment, the pre-assembled unit may additionally have the fixing device. If, after the bearing unit has been inserted into the receiving cup, the additional spring receiving device is connected non-positively and/or positively to the ring element, then the additional spring receiving device is inserted into the receiving cup together with the elastomer mount and the fixing device or together with the pre-assembled unit, the additional spring receiving device connecting non-positively and/or positively to the ring element during insertion, in particular during press-fitting. Advantageously, the elastomer mount, the fixing device and the additional spring receiving device or the pre-assembled unit and the additional spring receiving device are positioned before insertion in such a way that the elastomer mount faces the receiving cup and the additional spring receiving device faces the elastomer mount. The additional spring receiving device may be clipped, glued and/or welded to the ring element. The additional spring receiving device may be made of metal or plastic.

In an advantageous embodiment, the ring element and the additional spring receiving device are connected to each other by means of a snap connection. A snap connection may also be referred to as a clip connection. This makes it easy and inexpensive to connect the additional spring receiving device to the elastomer mount. Preferably, the additional spring receiving device has snap hooks or snap-in hooks which engage behind one or more snap-in lugs formed on the ring element.

In an advantageous embodiment, the fixing device reduces its diameter when inserted into the receiving cup. In an advantageous embodiment, the securing ring takes on a diameter which differs from the diameter of the securing ring in the assembly position and/or in the securing position when it is transferred from the assembly position to the securing position. To change the diameter, a force is required which is generated, for example, when the mounting device is pressed into the receiving cup.

In an advantageous embodiment, the ring element and/or the additional spring receiving device has a circumferential recess into which the fixing device can be pressed when inserted into the receiving cup. The recess thus provides an intermediate position for the fixing device or the securing ring, in which the latter has a smaller diameter than in the assembly position and in the securing position. In order to reduce the diameter of the securing ring, a force is required which is generated when the mounting unit is inserted into the receiving cup. If the securing ring has a round contour in cross-section, the reduction in diameter causes a prestress to be applied to the securing ring, so that it then pulls axially into the end position as soon as the securing ring has sufficient axial overlap with the undercut.

In an advantageous embodiment, the additional spring receiving device and the ring member have intermeshing positively connecting contours movable from a first position to a second position in order to transfer the fixing means and the elastomer mount from the assembly position to the securing position. A force is required to transfer the positively connecting contours from the first position to a second position. For this purpose, the positively connecting contours must be designed in such a way that the assembly forces required to change the diameter of the securing ring and to axially prestress the elastomer mount can be transferred. There may be a frictional force between the intermeshing positively connecting contours.

In an advantageous design, the positively connecting contours are designed as a snap-in device. The snap-in device is preferably designed as a two-stage snap-in device. In a first snap-in position, the additional spring receiving device is attached to the ring element and the securing ring is positioned between the additional spring receiving device and the ring element for assembly. The snap-in device is preferably designed in such a way that it can transfer the assembly forces, i.e. the diameter reduction of the retaining ring during insertion and the axial prestressing of the elastomer body. When the mounting unit is inserted, the securing ring is transferred to the intermediate position by first reducing the diameter of the securing ring. By further inserting it, the securing ring is transferred to the securing position as the securing ring engages behind the undercut. By further inserting the mounting unit into the receiving cup, the positively connecting contours are transferred to the second locking position. The snap-in device may be designed as a protrusion, in particular a circumferential protrusion, projecting from the spring receiving device which engages in recesses formed on the first ring element which define the two snap-in positions.

In an advantageous embodiment, the positively connecting contours are formed from a protrusion projecting from the additional spring receiving device and a corresponding recess introduced in the ring element. Advantageously, the protrusion serves as a supporting element for the snap ring in the securing position and blocks it such that it cannot spring back elastically and the strut or the vibration damper cannot move out of the receiving cup. Preferably, the protrusion can be inserted into the recess, wherein the protrusion has the elevation of the snap-in device and the recess has the indentations.

In an advantageous embodiment, the elastomer mount has a first ring element and a second ring element. Both ring elements are spaced apart in the axial direction. Preferably, the first ring element rests on the securing ring and the second ring element rests on the bottom of the cup. Due to the elasticity of the elastomer body, the two ring elements are movable relative to each other. In particular, if the second ring element is in contact with the bottom of the mounting cup, the first ring element can be moved towards the second ring element. This allows a prestress to be applied to the elastomer body. Due to the prestress, the elastomer mount has a longer service life. In addition, the second ring element exerts a force on the fixing device due to the prestress applied to the elastomer body, so that no relative movement can occur during the intended use. Noises can thus be avoided. Furthermore, axial length tolerances of the elastomer mount can be compensated by the axial displaceability of the two ring elements. Furthermore, the elastomer mount can easily be over-pressed during assembly in order to create space for transferring the fixing device to the locking position. In addition, length tolerances of the elastomer mount can be compensated as one of the ring elements abuts the fixing device without play. The two ring elements may be positively, non-positively and/or materially connected to the elastomer body.

Advantageously, the two ring elements abut against the wall of the receiving cup in a positive and/or non-positive manner. In particular, an outer diameter of the ring elements corresponds to an inner diameter of the receiving cup.

In an advantageous embodiment, a supporting structure is provided which abuts against the fixing device in order to prevent the fixing device from disengaging from the undercut. The support structure prevents the safety ring from springing back elastically and the strut or vibration damper from detaching from the receiving pot. In particular, the support structure is in contact with the securing ring in the securing position.

In an advantageous embodiment, the support structure is formed by a section of the additional spring support device or the ring element. However, it may also be designed as a separate component.

In an advantageous embodiment, the receiving cup is connected to the vehicle body in a non-positively, positively and/or materially connected manner. The receiving cup may be screwed, riveted, glued and/or welded to the vehicle body.

In an advantageous embodiment, the receiving cup has a first portion with a first inner diameter and a second portion with a second inner diameter, wherein the first inner diameter is greater than or equal to the second inner diameter, and wherein in the securing position the first ring element is arranged in the first portion and the second ring element in the second portion. As a result, the receiving cup has a stepped contour. The stepped shape of the receiving cup forms a shoulder within the receiving cup on which the first ring member can be supported, thereby preventing displacement of the first ring member in the direction of deflection. In addition, the shoulder serves as a stop for the first ring element when the mounting unit is inserted or pressed into the receiving cup. This blocks the first ring element so that the additional spring receiving device can be transferred to the second snap-in position if it is pushed forward further.

The invention also relates to a strut or a vibration damper having a mounting system.

BRIEF DESCRIPTION OF THE DRAWINGS

In the following, the mounting system as well as further features and advantages are explained in more detail on the basis of exemplary embodiments, which are illustrated schematically in the figures. Shown are.

DETAILED DESCRIPTION

Figure 1:
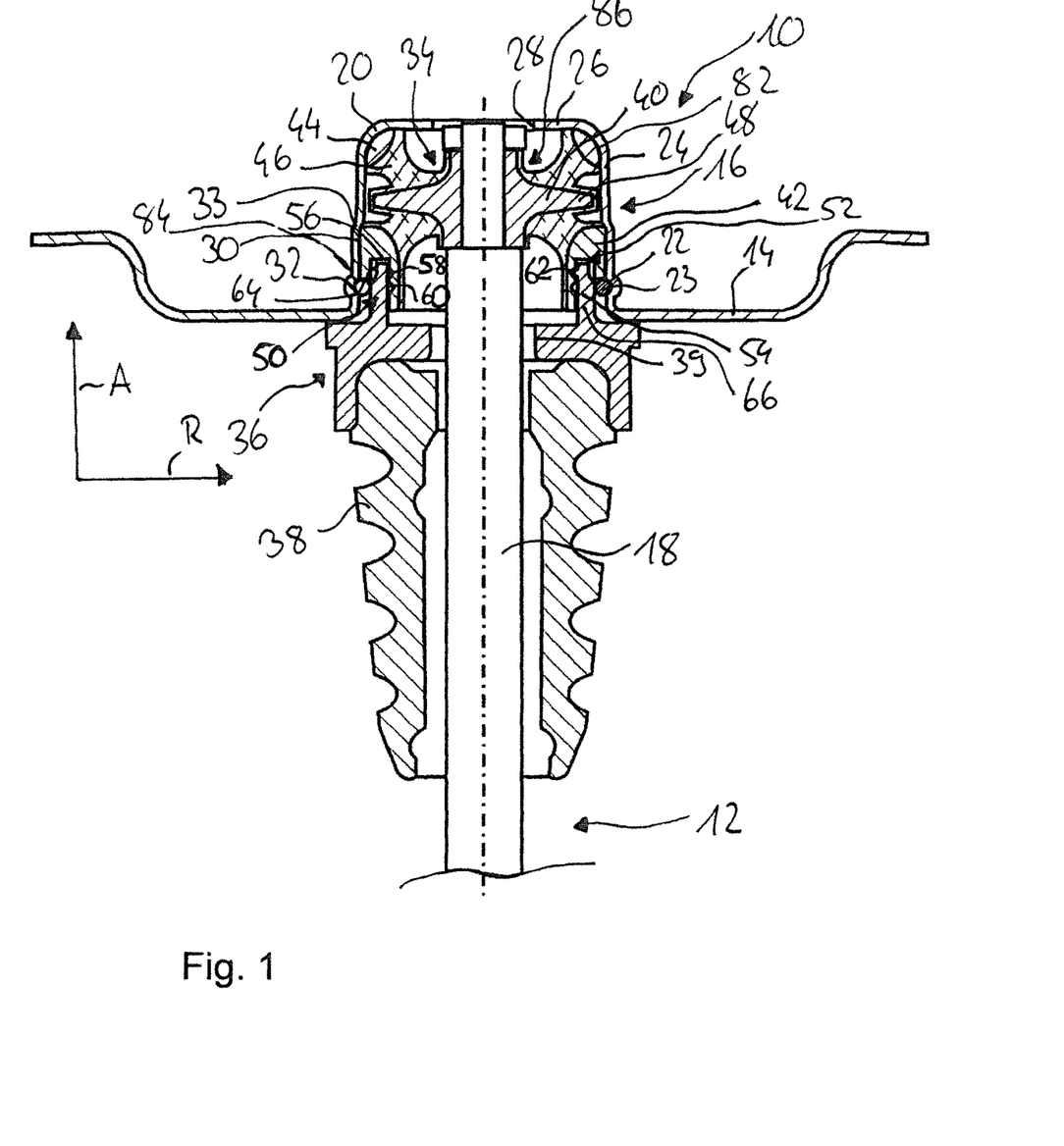
FIG. 1 a cross-section of a mounting system according to a first embodiment having a piston rod and an additional spring.

FIG. 1 shows a mounting system 10 for the elastic mounting of a strut 12 or a vibration damper on a vehicle body 14.

The mounting system 10 has a mounting unit 16 for mounting a piston rod 18 of the strut 12 or a vibration damper, a receiving cup 20 on the vehicle body side into which the mounting unit 16 can be inserted, and a fixing device 22. The fixing device 22 is designed as a securing ring 23.

In the exemplary embodiment shown in FIG. 1, the receiving pot is formed by a section of the vehicle body 14. The receiving cup 20 has a cup wall 24 and a cup bottom 26 which is provided with an opening 28 through which a section of the piston rod 18 can extend. The receiving cup 20 has an undercut 30, in the present case formed as a circumferential groove 32, in which the securing ring 23 engages to secure the mounting unit 16 in the receiving cup 20.

The receiving cup 20 is also provided with a circumferential shoulder 33. The shoulder 33 divides the receiving cup 20 into a first section 82 having a first inner diameter and a second section 84 having a second inner diameter, the first inner diameter being larger than the second inner diameter. As a result, the receiving cup 20 is stepped.

The mounting unit 16 has an elastomer mount 34 for mounting the piston rod 18 and an additional spring receiving device 36, which are positively and/or non-positively connected to each other, as explained in more detail below.

The additional spring receiving device 36 is made of plastic and serves to receive an additional spring 38. The additional spring 38 limits a movement of the strut 12 relative to the vehicle body 14. The additional spring receiving device 36 has an opening 39 through which the piston rod 18 can extend. The additional spring 38 surrounds the piston rod 18.

The elastomer mount 34 has a core 40 to receive the piston rod 18, a first ring element 42, a second ring element 44 and an elastomer body 46 connecting the core 40 and the two ring elements 42, 44 with each other. The two ring elements 42, 44 are spaced from the core 40 in the radial direction R and from each other in the axial direction A. The core 40 has a stop section 48 projecting in the radial direction R, which is arranged between the two ring elements 42, 44. The stop section 48 limits movement of the core 40 relative to the two ring elements 42, 44.

In the inserted state of the mounting unit 16 in the receiving cup 20 shown in FIG. 1, the first ring element 42 is arranged within the first section 82 and is supported on the shoulder 33, and the second ring element 44 is arranged within the second section 84 and rests on the cup bottom 26. The two ring elements 42, 44 are moved towards each other in axial direction A in the inserted state, so that a pretension is introduced into the elastomer body 46.

As shown in FIG. 1, the elastomer mount 34 and the additional spring receiving device 36 are positively and/or non-positively connected to each other. The additional spring receiving device 36 and the first ring element 42 have intermeshing positively connecting contours 50. As can be seen in particular from an overall view of FIGS. 2 to 4, the intermeshing positively connecting contours 50 can be transferred from a first position to a second position.

The positively connecting contours 50 are formed from a snap-in device 52, a protrusion 54 projecting from the additional spring receiving device 36 and a corresponding recess 56 introduced into the first ring element 42. The snap-in device 52 is formed by an elevation 58 projecting radially inwards from the protrusion 54, a first depression 60 introduced into a side wall of the recess 56 and a second depression 62 introduced into the side wall of the recess 56, into which the elevation 58 engages in a positive fit. The protrusion 54 can be pushed into the recess 56 and has a circumferential clearance 64 at its free end on the outside circumference into which the securing ring 23 can be inserted.

Figure 2:
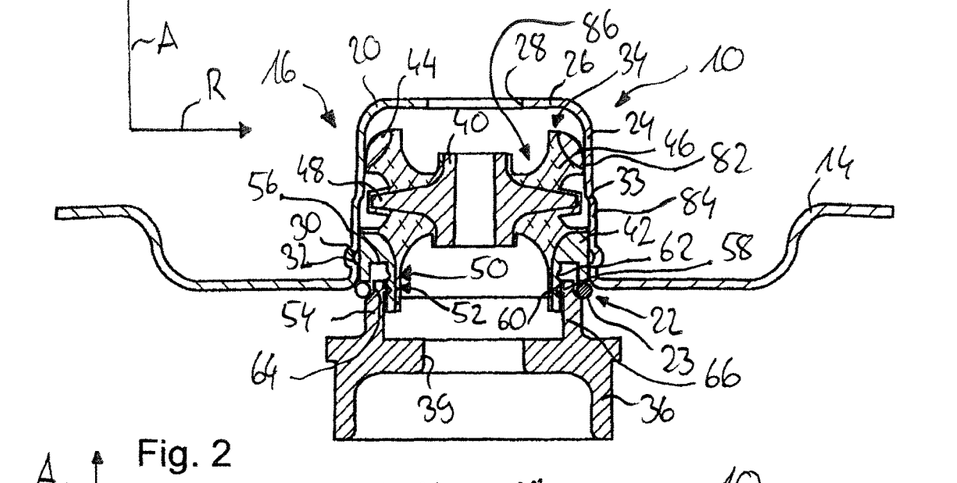
FIG. 2 a cross-section of the mounting system according to the first embodiment having a piston rod and an additional spring in an assembly position.

In the following, the fastening of the mounting unit 16 in the receiving cup 20 is described using FIGS. 2 to 4. First, a pre-assembled unit 86 is created comprising at least the elastomer mount, the fixing device 22, the additional spring receiving device 36, the additional spring 38 and the piston rod 18 not shown in FIGS. 2 to 4. For this purpose, the safety ring 23 is first inserted into the circumferential clearance 64. The additional spring receiving device 36 is then pre-assembled with the elastomer mount 34 by inserting the protrusion 54 into the recess 56 in such a way that the elevation 58 engages in the first depression 60. Then the piston rod 18 with the additional spring 38 previously fitted onto it is guided through the core 40 of the elastomer mount 34 and fixed there by means of a not shown nut. Then the pre-assembled unit 86 comprising the elastomer mount 34, the additional spring receiving device 36 connected to the elastomer mount 34, the securing ring 23, the additional spring 38 and the piston rod 18 of the strut 12 are brought into the assembly position by inserting the pre-assembled unit 86 from below into the receiving cup 20 as shown in FIG. 2. When the mounting unit 16 is inserted into the receiving cup 20, the securing ring 23 has a first diameter.

By pushing the mounting unit 16 into the receiving cup 20 by applying a force acting in axial direction A to the additional spring mounting device 36, the mounting unit 16 is pushed into the receiving cup 20 until the first ring element 42 rests against the cup bottom 26. At the same time, the securing ring 23 is transferred to an intermediate position by pressing the securing ring 23 into the clearance 64. In the intermediate position shown in FIG. 3, the securing ring 23 has a second diameter which is smaller than the first diameter.

Figure 3:
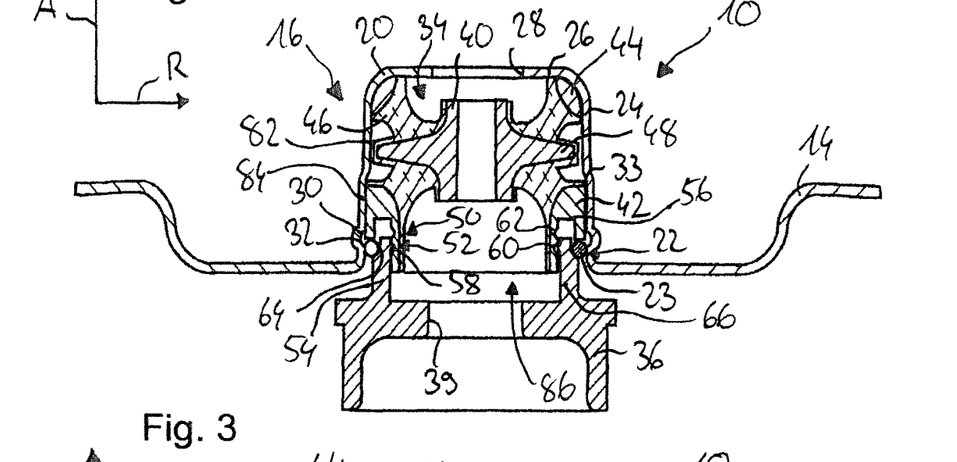
FIG. 3 a cross-section of the mounting system according to the first embodiment without piston rod and without additional spring in an intermediate position.

FIG. 3 shows the intermediate position shortly before the securing ring 23 snaps into the groove 32, where the second ring element 44 rests against the cup bottom 26. When the mounting unit 16 is pressed further into the receiving cup 20, the first ring element 42 of the elastomer mount 34 slides further upwards until the securing ring 23 slides into the groove 32 and presses the first ring element 42 into its upper end position, in which the first ring element 42 abuts against the shoulder 33. In this position, the elastomer body 46 is prestressed and the first ring element 42 abuts against the securing ring 23 without play. This prevents the extension unit 16 from being pulled out of the receiving cup 20 in the direction of deflection.

Figure 4:
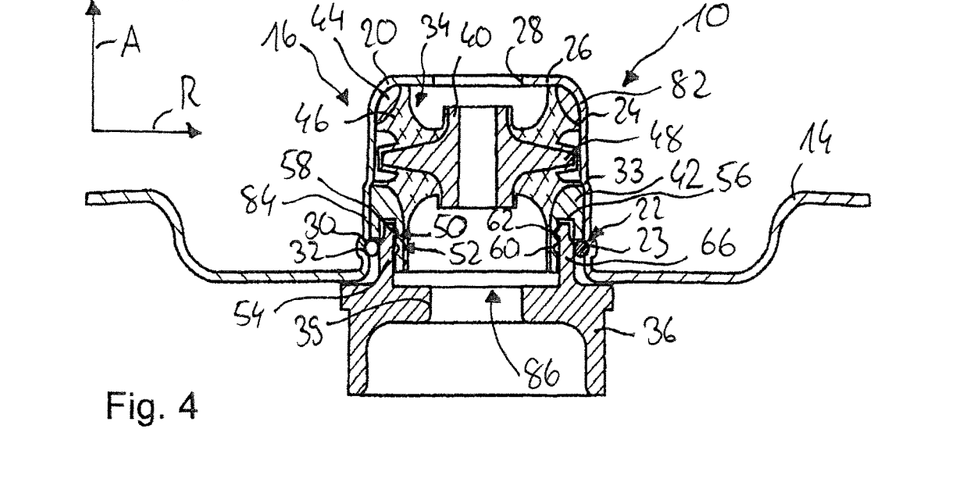
FIG. 4 a cross-section of the mounting system according to the first embodiment without piston rod and without additional spring in a locking position.

Since the first ring element 42 is supported on the shoulder 33 of the receiving cup 20, further pressing of the mounting unit 16 into the receiving cup 20 causes the snap-in device 52 to move into the second snap-in position shown in FIG. 4, in which the elevation 58 engages in the second depression 62. The snap-in device 52 is thus matched in such a way that the force required to transfer the snap-in device 52 from the first snap-in position shown in FIG. 2 to the second snap-in position shown in FIG. 4 is greater than the force required to prestress the elastomer mount 34 and to press the securing ring 23 into the groove 32.

As can also be seen in FIG. 4, in the second snap-in position the protrusion 54 acts as a support structure 66. For this purpose the protrusion 54 lies radially on the inside of the securing ring 23 and thus prevents it from springing back elastically and the mounting unit 16 from being released from the receiving cup 20.

In the following, further designs for the mounting system 10 are described, wherein the same reference signs are used for identical or functionally identical parts.

Figure 5:
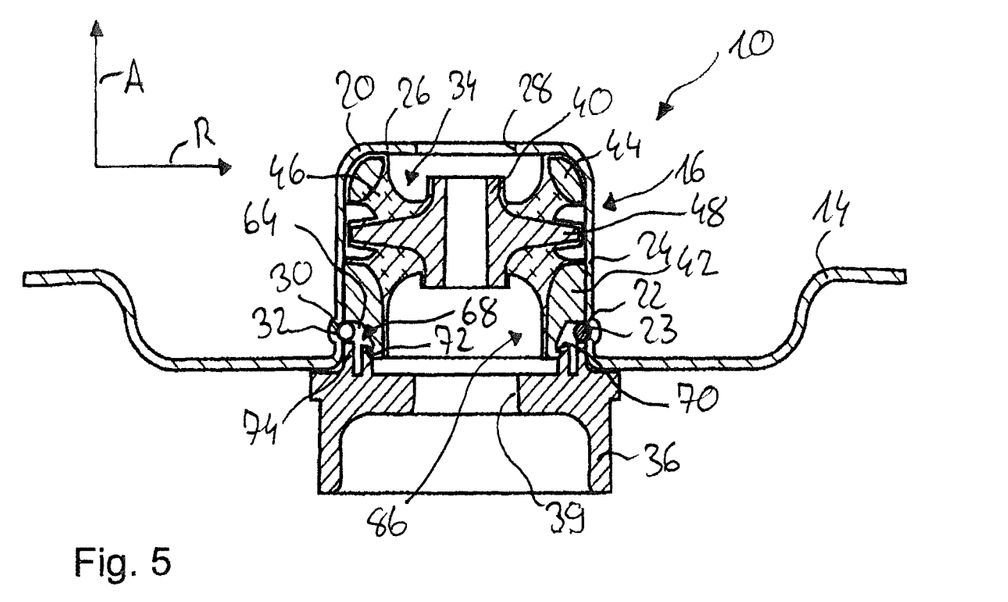
FIG. 5 a cross-section of the mounting system according to a second embodiment in the locking position.

FIG. 5 shows a second version of the mounting system 10, which differs from the first embodiment in that the additional spring receiving device 36 is already connected to the first ring element 42 in the pre-assembled unit 86 by means of a snap connection 68 or clip connection, the securing ring 23 being positioned between the ring element 42 and the additional spring receiving device 36. In addition, the second embodiment differs from the first embodiment in that the receiving cup 20 has no circumferential shoulder 33 against which the first ring element 42 can be fitted.

The second embodiment has no support structure 66. As a result, the securing ring is not supported from the inside in the end position in the groove 32, so that the forces that can be transmitted in the opposite direction to the mounting direction are lower than in the first exemplary embodiment due to the risk of slipping out.

The snap connection 68 is formed by snap hooks 70, which project radially from the additional spring receiving device 36, and a snap-in lug 72, which projects from the first ring element 42. The snap hooks 70 engage behind the snap-in lug 72 and thus fix the additional spring receiving device 36 to the elastomer mount 34.

As can also be seen in FIG. 5, the second embodiment also differs from the first embodiment in that the clearance 64, which allows the diameter of the securing ring 23 to be reduced in the intermediate position, is introduced into the first ring element 42.

In addition, the additional spring receiving device 36 has a support section 74 with which the securing ring 23 is pushed into the securing position.

Figure 6:
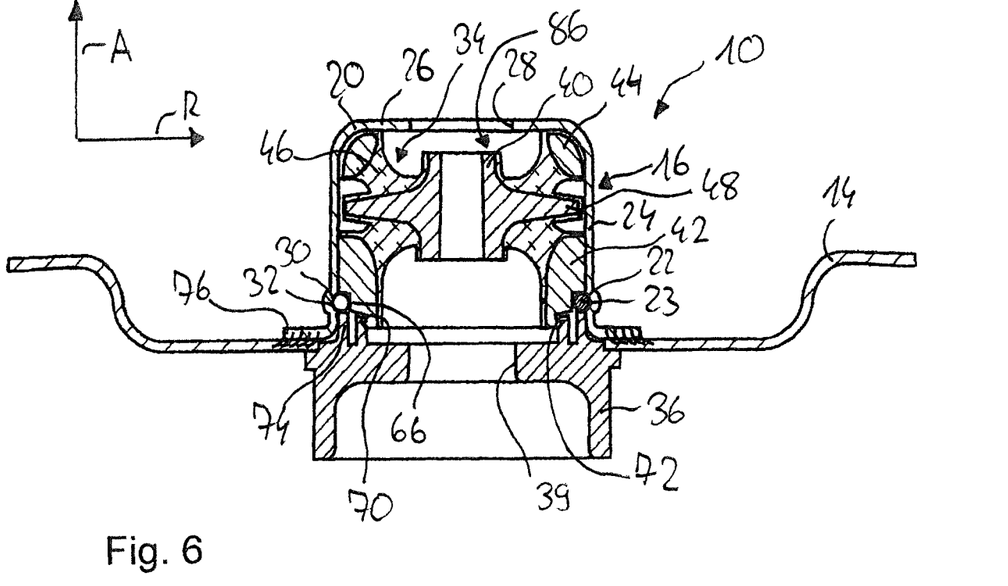
FIG. 6 a cross-section of the mounting system according to a third embodiment in a securing position.

FIG. 6 shows a third embodiment of the mounting system 10, which differs from the second embodiment in that the receiving cup 20 is designed as a separate component and is materially connected, for example by gluing or welding, to the vehicle body 14 via a flange section 76 projecting from the receiving cup 20.

In addition, with the third embodiment shown in FIG. 6, the support structure 66 is formed from a section of the first ring element 42.

For the assembly of the mounting unit 16 shown in FIG. 6, the securing ring 23 and the additional spring receiving device 36, it is necessary to first push the pre-assembled unit 86, which consists at least of the elastomer mount 34, the connected and not shown piston rod, the securing ring 23 and the additional spring receiving device 36, into the receiving cup 20. The first ring element 42 must then be over-pushed upwards so that the securing ring 23 can engage in the groove 32. For this purpose, a force is applied to the additional spring receiver 36 in the direction of assembly or towards the body, which is introduced into the ring element 42 via the securing ring 23, which is slightly reduced in diameter. When the groove 32 is reached, the securing ring 23 can assume a larger diameter and thus form the undercut 30. As a result, the overlap in the mounting direction of the securing ring 23 and ring element 42 disappears, so that ring element 42, which is overpushed upwards, can slide down again by a few millimetres. The support structure 66 of the ring element 42 penetrates into the securing ring so that it can no longer slip out of the groove 32. When the ring element 42 is exchanged downwards, the ring element 42 and the additional spring retainer 36 engage simultaneously by means of the snap hooks 70.

Figure 7:
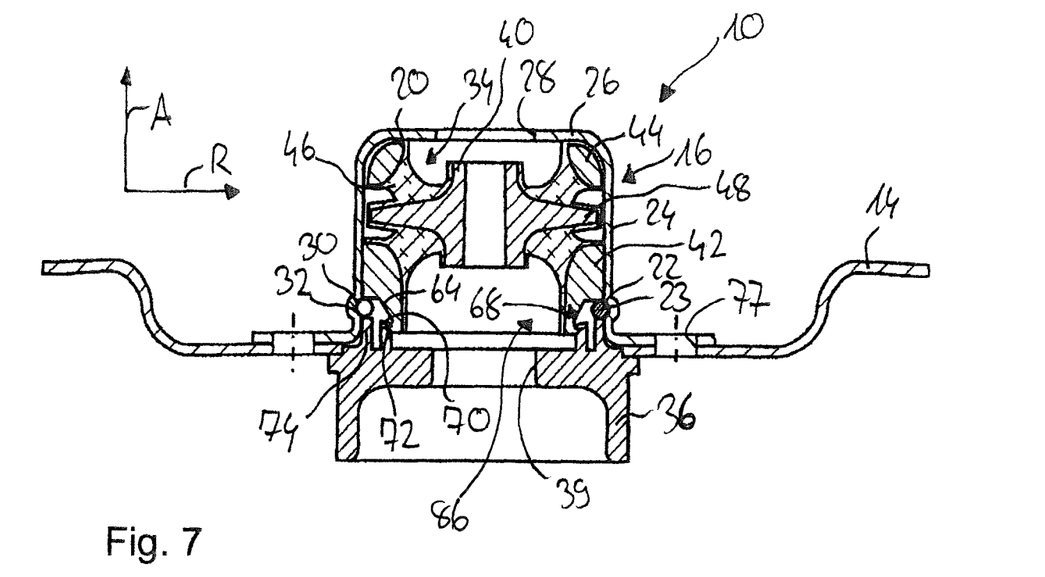
FIG. 7 a cross-section of the mounting system according to a fourth embodiment in the securing position.

FIG. 7 shows a fourth embodiment of the mounting system 10, which differs from the second embodiment in that the receiving cup 20 is screwed to the vehicle body 14, in particular to its flange section 76. For this purpose, bores 77 are drilled into the vehicle body 14 and the flange section. This means that the receiving cup can be detachably connected to the vehicle body at a time when there is still good assembly access to the connecting elements such as screw heads or nuts from both the body side and the opposite side. The assembly of the pre-assembled unit 86, which includes the mounting unit 16, can be carried out at a later point in time independently of the assembly of the receiving cup, without the need for assembly access from the body side.

Figure 8:
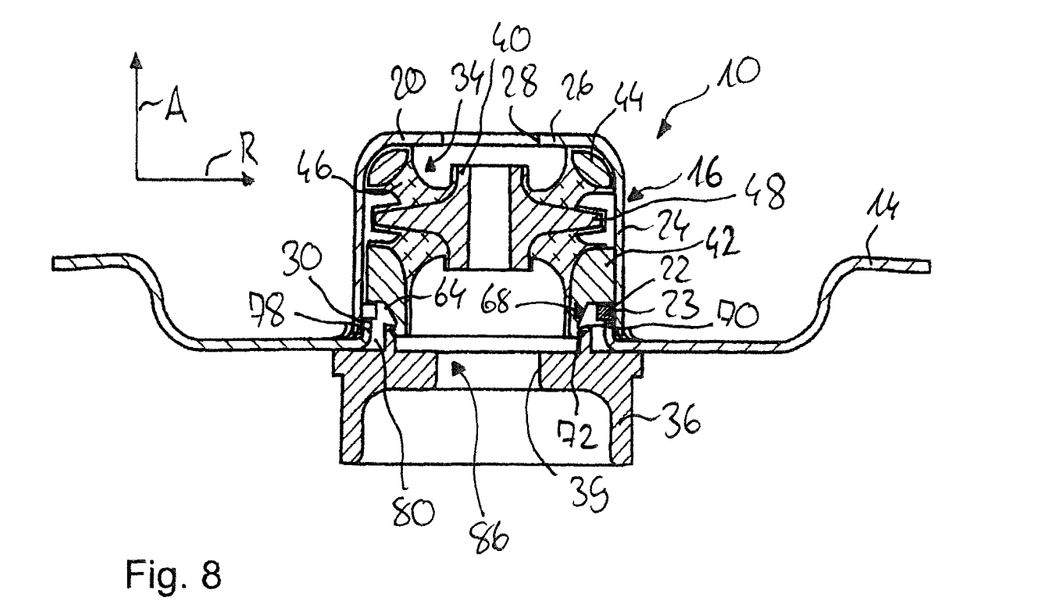
FIG. 8 a cross-section of the mounting system according to a fifth embodiment in the securing position.

FIG. 8 shows a fifth embodiment of the mounting system 10, which differs from the other embodiments in the design of the undercut 30. The undercut 30 is formed by a shoulder 78 protruding into the interior of the receiving cup 20, which is created by flanging an edge section of the passage 80.

In the embodiment shown in FIG. 8, the receiving cup 20 is materially connected to the vehicle body 14 by means of adhesive bonding or welding, for example. With the embodiment shown in FIG. 8, the securing ring 23 is rectangular in cross-section.

Figure 9:
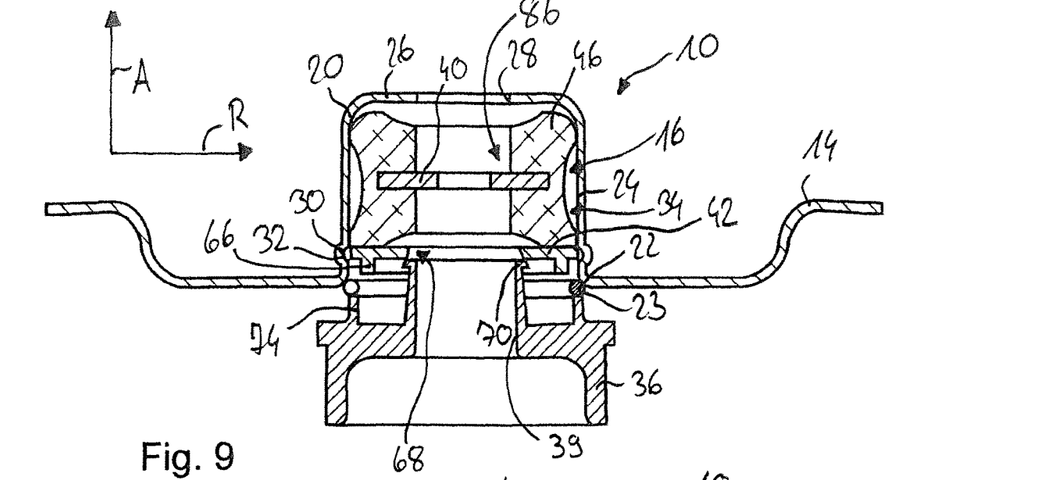
FIG. 9 a cross-section of the mounting system according to a sixth embodiment in an assembly position.
Figure 10:
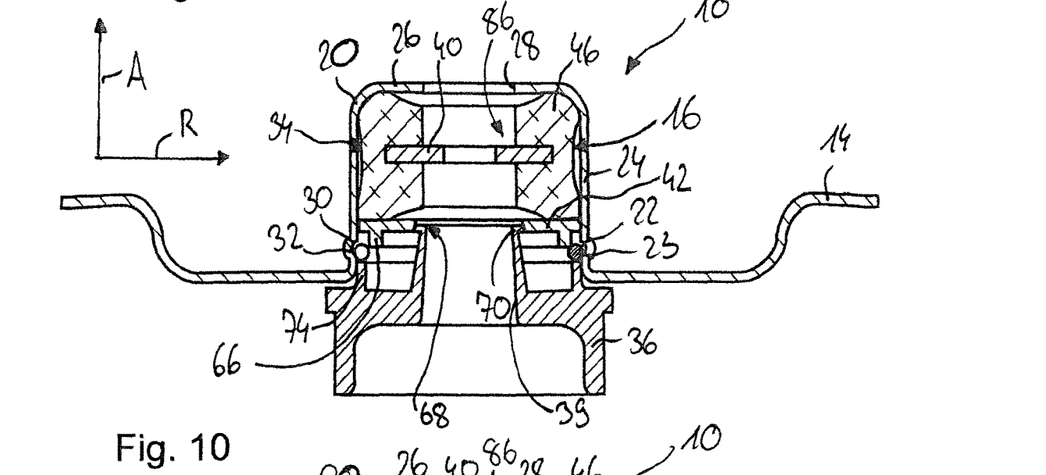
FIG. 10 a cross-section of the mounting system according to a sixth embodiment in an intermediate position.
Figure 11:
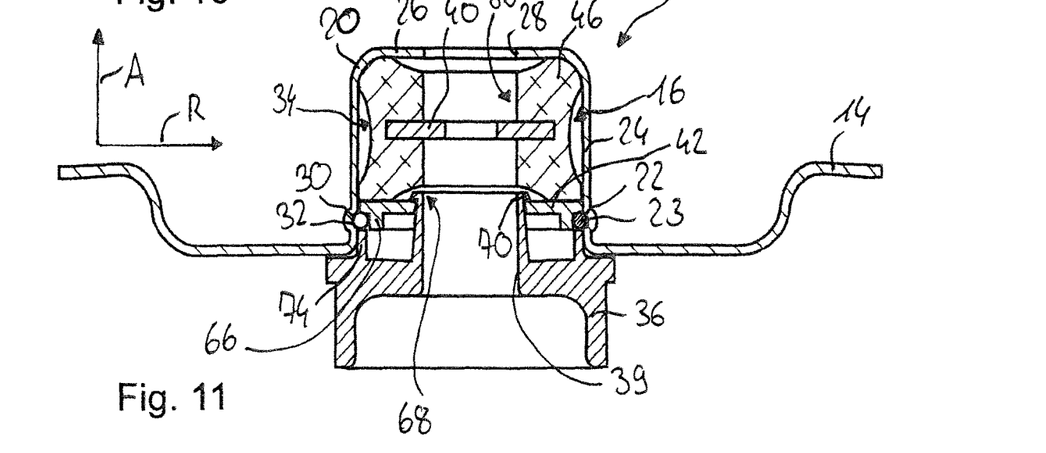
FIG. 11 a cross-section of the mounting system according to a sixth embodiment in a securing position.

FIGS. 9 to 11 show a sixth embodiment of the mounting system 10, which differs from the previous embodiments in that the elastomer mount 34 has only a first ring element 42 and a core 40 in the form of a disc. The first ring element 42 is designed as a separate part which, together with the elastomer mount 34, can be inserted into the receiving cup 20. In addition, the sixth embodiment differs from the first embodiment in that the additional spring receiving device 36 and the fixing device 22, which here is designed as a securing ring 23 with a rectangular cross-section, do not have to be part of the pre-assembled unit 86. Rather, it is sufficient for the pre-assembled unit 86 to consist of the elastomer mount 34 and the not shown piston rod connected to it. If the first ring element 42 is a separate part, it need not be part of the pre-assembled unit. Advantageously, the ring element 42, the fixing device 22, the additional spring receiving device 36 and optionally further components of the strut are combined in the pre-assembled unit 86. The snap connection 70, on the other hand, connects the ring element 42 and the additional spring receiving device 36 only in the final assembly position shown in FIG. 11.

FIG. 9 shows the mounting position in which the elastomer mount 34 together with the first ring element 42 is inserted into the receiving cup 20. The additional spring receiving device 36 is not yet engaged with the first ring element 42 in the mounting position. In the mounting position, the securing ring 23 rests on the support section 74 and must still thread and taper in diameter.

In the intermediate position shown in FIG. 10 the elastomer body 46 rests against the cup bottom 26 and is axially prestressed. The snap hooks 70 are already pressed radially inwards and the diameter of the securing ring 23 is tapered.

FIG. 11 shows the securing position in which the securing ring 23 is engaged in the undercut 30. The snap hooks 70 are also snapped in and engage behind the first ring element 42. The first ring element 42 is spring-back due to the prestress of the elastomer body 46 in the securing position and presses the first ring element 42 against the securing ring 23. The first ring element 42 also has a support structure 66 which blocks the securing ring 23 from the inside.

Figure 12:
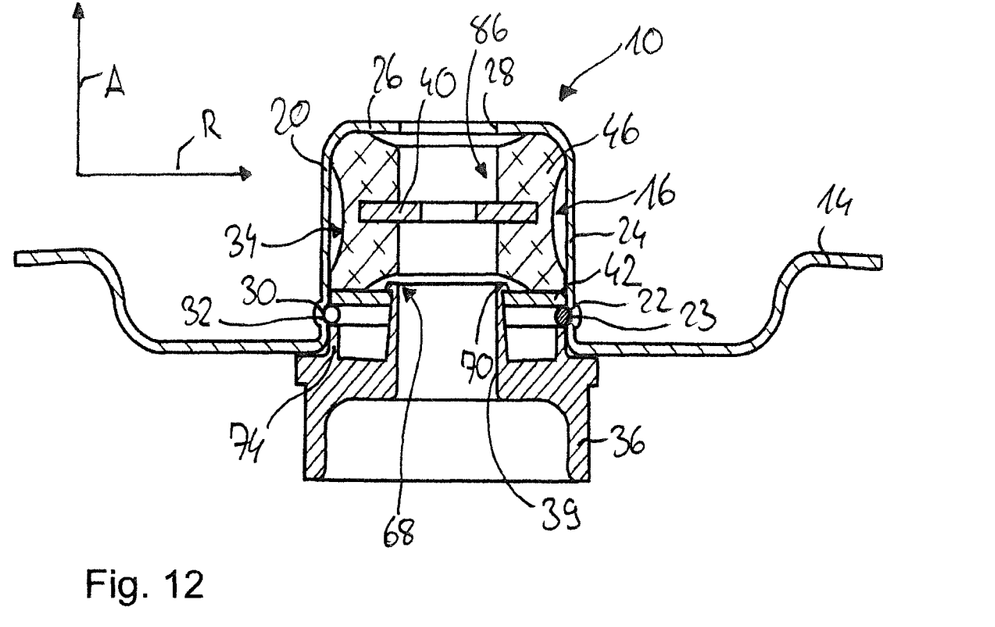
FIG. 12 a cross-section of the mounting system according to a seventh embodiment in a securing position.

FIG. 12 shows a seventh embodiment of the mounting system 10, which differs from the sixth embodiment in that the first ring element 42 has no support structure 66.

The mounting system 10 is characterised in that the mounting unit 16 is inserted from below into the receiving cup 20 when the piston rod 18 has already been fitted and is secured against withdrawal from the receiving cup 20 by means of a securing ring 23 which engages in a groove 32 formed on the receiving cup 20. This simplifies assembly and provides more installation space for other components in the vehicle, as there is no longer a need for access from the body side when connecting the piston rod 18 to the core 40 of the elastomer mount 34. This also reduces assembly costs. In addition, the bearing system 10 can be dismantled without access from the other side of the vehicle body 14 by unlocking the snap-in lug 72 of the additional spring receiving device 36 and then releasing the fixing device 22 from below. This makes it easy to disassemble the strut 12 or the vibration damper including mounting unit 16 in the event of a repair.

The invention claimed is:

1. A mounting system for the elastic mounting of a strut or a vibration damper on a vehicle body in a receiving cup on a body side, the mounting system comprising:
    a unit that is insertable into said receiving cup;
    a fixing device that secures the unit from being withdrawn from the receiving cup, the unit having a mounting unit and a piston rod of the strut or the vibration damper;
    wherein the mounting unit has at least one elastomer mount for resiliently mounting the piston rod, the elastomer mount having a core for receiving the piston rod and an elastomer body, and having at least one ring element that is a separate part or is non-positively, positively and/or materially connected to the elastomer body;
    wherein the unit and the fixing device are configured for insertion into the receiving cup from a side facing away from the body and, in an inserted state, the fixing device engages behind an undercut formed on the receiving cup;
    wherein the at least one ring element is supported on the fixing device, and the elastomer body is prestressed and presses the ring element against the fixing device; and
    wherein the mounting unit has an additional spring receiving device, the additional spring receiving device and the ring element have intermeshing positively connected contours which are movable from a first position into a second position when the elastomer mount and the fixing device are inserted into the receiving cup.

2. The mounting system according to claim 1, wherein the piston rod is non-positively, positively and/or materially connected to the core before being inserted into the receiving cup.

3. The mounting system according to claim 1, wherein the receiving cup has an opening which allows for assembling or disassembling the piston rod and the core.

4. The mounting system according to claim 1, wherein the fixing device comprises a securing ring.

5. The mounting system according to claim 1, wherein the undercut comprises a circumferential groove introduced into the receiving cup.

6. The mounting system according to claim 1, wherein the undercut comprises a shoulder projecting into the inside of the receiving cup.

7. The mounting system according to claim 1, wherein the additional spring receiving device is non-positively, positively and/or materially connected to the ring element before the unit is inserted into the receiving cup, or which is non-positively, and/or positively connected to the ring element after the unit is inserted into the receiving cup.

8. The mounting system according to claim 7, wherein the ring element and the additional spring receiving device are connected to one another by a snap connection.

9. The mounting system according to claim 1, wherein the fixing device reduces its diameter when being inserted into the receiving cup.

10. The mounting system according to claim 1, wherein the ring element and/or the additional spring receiving device have a circumferential clearance into which the fixing device can be pressed when being inserted into the receiving cup.

11. The mounting system according to claim 1, wherein the positively connected contours comprise a snap-in device.

12. The mounting system according to claim 1, wherein the positively connected contours are formed by a protrusion projecting from the additional spring receiving device and a corresponding recess introduced into the ring element.

13. The mounting system according to claim 1, wherein the elastomer mount comprises a first ring element and a second ring element.

14. The mounting system according to claim 1, including a support structure that abuts the fixing device to prevent the fixing device from disengaging from the undercut.

15. The mounting system according to claim 1, wherein the receiving cup is positively, non-positively and/or materially connected to the vehicle body.

16. A strut or vibration damper including a mounting system according to claim 1.

17. A mounting system for the elastic mounting of a strut or a vibration damper on a vehicle body in a receiving cup on a body side, the mounting system comprising:
- a unit that is insertable into said receiving cup;
- a fixing device that secures the unit from being withdrawn from the receiving cup, the unit having a mounting unit and a piston rod of the strut or the vibration damper;
- a support structure that abuts the fixing device;
- wherein the mounting unit has at least one elastomer mount for resiliently mounting the piston rod, the elastomer mount having a core for receiving the piston rod and an elastomer body, and having at least one ring element that is a separate part or is non-positively, positively and/or materially connected to the elastomer body;
- wherein the unit and the fixing device are configured for insertion into the receiving cup from a side facing away from the body and, in an inserted state, the fixing device engages behind an undercut formed on the receiving cup, the support structure is configured to prevent the fixing device from disengaging from the undercut;
- wherein the at least one ring element is supported on the fixing device, and the elastomer body is prestressed and presses the ring element against the fixing device; and
- wherein the support structure is formed from a portion of an additional spring receiving device or the ring element.

\* \* \* \* \*